April 5, 1966  N. L. PETERSON  3,244,958
SEMI-CONDUCTOR CONTROL SYSTEMS
Filed Dec. 8, 1958
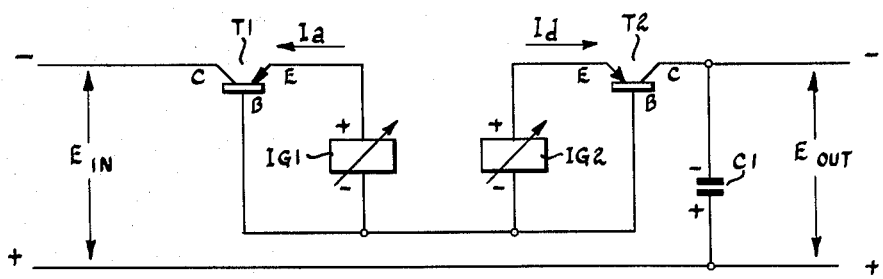
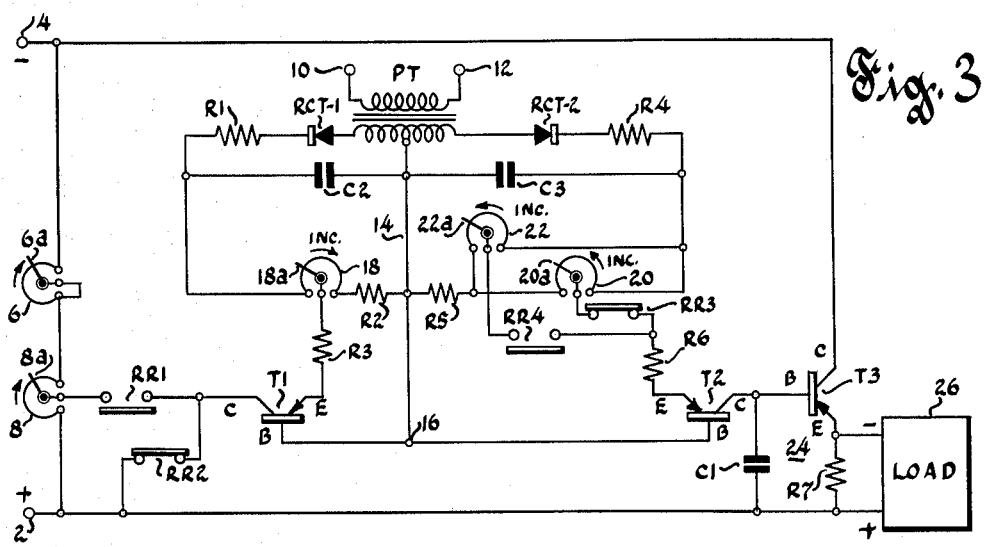
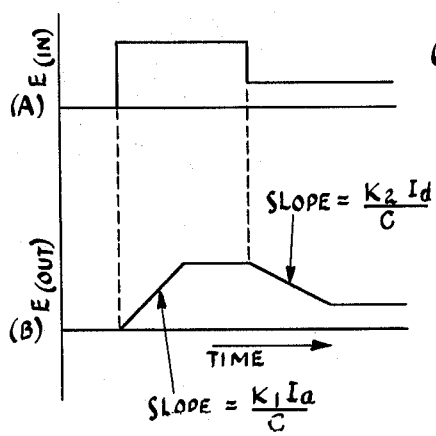
Inventor
Norman L. Peterson
By H R Rather
Attorney United States Patent Office 3,244,958
Patented Apr. 5, 1966

3,244,958
SEMI-CONDUCTOR CONTROL SYSTEMS
Norman L. Peterson, Wauwatosa, Wis., assignor to Cutler-Hammer, Inc., Milwaukee, Wis., a corporation of Delaware
Filed Dec. 8, 1958, Ser. No. 779,000
11 Claims. (Cl. 320—1)

This invention relates to electronic control systems and more particularly to timed reference energy control systems for providing a selectively constant current or a voltage which will increase or decrease linearly at a preselected rate.

While not limited thereto, the invention is especially applicable to controlling the speed of a direct current motor in an adjustable voltage drive system.

A general object of the invention is to provide an improved electrical circuit capable of providing a constant output current the value of which may be preselected or an output voltage which will vary at a preselected rate.

A more specific object of the invention is to provide improved electrical control means for affording a constant output current having a preselected value or an output voltage which will increase or decrease at preselected rates which may be adjusted.

Another specific object of the invention is to provide an improved timed reference circuit for affording an output voltage which will vary linearly at a preselected timed rate all the way to zero voltage difference between the input voltage and the output voltage.

Another object of the invention is to provide, in a motor control system, timed reference electrical control means of improved construction and operation.

Other objects and advantages of the invention will hereinafter appear.

While the circuitry hereinafter described is effectively adapted to fulfill the objects stated, it is to be understood that I do not intend to confine my invention to the particular preferred embodiment of control systems disclosed, inasmuch as they are susceptible of various modifications without departing from the scope of the appended claims.

The invention will now be described in detail with reference to the accompanying drawings, wherein:

FIGURE 1 schematically depicts a control system constructed in accordance with the invention;

FIG. 2 is a graphical representation of the operting characteristics of the system of FIG. 1; and FIG. 3 is a circuit diagram of the invention as applied to a motor control system.

Referring to FIG. 1, there is shown a timed reference circuit having a left-hand input end and a right-hand output end. A pair of semi-conductor devices such as transistors or the like are arranged in reverse order in serial relation with the input end. For this purpose, there is provided a transistor T1 and a transistor T2 of the P-N-P conductivity type each having an emitter electrode E, a base electrode B and a collector electrode C. The collector electrode of transistor T1 is connected to the negative side of the input voltage source $E_{in}$ and the collector electrode of transistor T2 is connected to the negative side of the output. The base electrodes of the transistors are connected to one another. A pair of control current sources IG1 and IG2 are connected between the base electrode and emitter electrode of transistors T1 and T2, respectively, the positive side of each current source being connected to the respective emitter electrode. A capacitor C1 is connected across the output end so as to be in series with the input source and the transistor network.

Each current source IG1 and IG2 is preferably controllable so as to afford preselection of the magnitude of the forward conduction current of the respective transistor.

The system shown in FIG. 1 utilizes two significant transistor characteristics; (1) for normal polarity connections, the collector current is a function of the emitter current and is essentially independent of collector voltage; and (2) the transistor functions substantially as a short circuit to currents opposite to the normal polarity connections. Therefore, when the input voltage is higher than the output voltage, a current will flow from the input source to charge capacitor C1. This current will flow through transistor T2 as if it were a short circuit and will charge capacitor C1 until the output voltage equals the input voltage. Since the magnitude of this current is essentially solely a function of the emitter current $Ia$ of transistor T1 and the latter current is constant for any given setting of source IG1, the voltage across capacitor C1 will increase as a linear function of time.

If the input voltage is decreased so that the output voltage has a higher value, the output voltage, that is, the voltage across capacitor C1, will decrease as a linear function of time until the output voltage equals the input voltage. Thus, capacitor C1 discharges throuh transistor T1 as if it were a short circuit. The magnitude of this current is essentially solely a function of the emitter current $Id$ of transistor T2 and since the latter current is constant for any given setting of source IG2, the voltage across capacitor C1 will decrease as a linear function of time.

Let it be assumed that each current source IG1 and IG2 is set so as to afford predetermined different amounts of conduction in transistors T1 and T2, respectively, when proper voltage conditions are present and that a direct current voltage $E_{in}$ is applied to the input end. When the input voltage is applied as shown in FIG. 2(A), current flows from the positive input side through capacitor C1, collector C and base B of transistor T2 in the reverse direction and then through source IG1, emitter E and collector C of transistor T1 to the negative side of the input source. Source IG1 effects operation of transistor T1 to conduct a predetermined value of current depending upon the setting of source IG1 which value remains constant for any given setting. At the same time, transistor T2 acts as a short circuit in its reverse direction so as not to hinder the current flow to capacitor C1. This constant current flow effects linear charging of capacitor C1 as shown by the ascending curve in FIG. 2(B). As a result, output voltage $E_{out}$ increases in a linear manner at a timed rate.

It will be apparent that the slope of the ascending portion of the output voltage versus time curve in FIG. 2(B) and consequently the rate of output voltage increase may be changed as desired by adjusting the value of control current at source IG1.

When the voltage across capacitor C1 increases to a value where it equals the value of input voltage $E_{in}$ as shown by the left-hand horizontal portion of the curve in FIG. 2(B) the ouput voltage remains constant.

Let it be assumed that the input voltage decreases or is decreased to a lower value as shown by the curve in FIG. 2(A). As a result, capacitor C1 discharges in a circuit extending through the input source, collector C and base B of transistor T1 in the reverse direction, source IG2 and the emitter and collector of transistor T2. The setting of control source IG2 now controls the value of the current flow which remains constant for any given setting of source IG2 and transistor T1 acts as a short circuit. As a result, the voltage across capacitor C1 and consequently the output voltage decreases linearly as shown by the descending slope of the curve in FIG. 2(B) until the voltage across capacitor C1 equals the input voltage. Thereafter, the output voltage remains constant as shown by the right-hand horizontal portion of the curve in FIG. 2(B). It will be apparent that the slope of the descending portion of the output voltage versus time curve and the rate of output voltage decrease is controlled by and may be preselected by adjusting source IG2.

Referring to FIG. 3, there is shown a practical application of the timed reference system of FIG. 1 to a motor control system or the like. There are shown positive and negative input terminals 2 and 4, respectively, connectable to a suitable source of reference voltage. A maximum speed potentiometer 6 and a speed setter potentiometer 8 are connected in series across terminals 2 and 4. The movable arm 6a is connected directly to the lower side of potentiometer 6 so that movement of the arm in the clockwise direction shunts out resistance. The movable arm 8a of potentiometer 8 is connected through normally open run contacts RR1 to collector electrode C of transistor T1. Collector electrode C is also connected through normally closed contacts RR2 to input terminal 2. Movement of arm 8a in the clockwise direction increases the input reference voltage to the transistor circuit and movement of arm 8a in the counterclockwise direction decreases such input reference voltage. Adjustment of potentiometer 6 determines the maximum voltage that can be applied to the transistor circuit.

Positive input terminal 2 is also connected through a capacitor C1 to the collector electrode C of transistor T2. The base electrodes B of transistors T1 and T2 are connected directly to one another.

Control current is obtained through a transformer PT having its primary winding connectable through terminals 10 and 12 to a suitable alternating current source. The secondary winding of transformer PT is provided with a center tap which is connected through a conductor 14 to the junction 16 of the base electrodes B. The left-hand end of the secondary winding is connected through a half-wave rectifier RCT-1, a resistor R1, an acceleration timing potentiometer 18 and a resistor R2 to conductor 14, the junction of resistor R1 and potentiometer 18 being connected through a filter capacitor C2 to conductor 14. Movable arm 18a of potentiometer 18 is connected through a resistor R3 to the emitter electrode of transistor T1. As a result, movement of arm 18a in the clockwise direction effects decrease in the emitter to base current in transistor T1 and consequently increases the acceleration time.

The right-hand end of the secondary winding of transformer PT is similarly connected through a half-wave rectifier RCT-2, a resistor R4, a stopping timing potentiometer 20 and a resistor R5 to conductor 14, the junction of resistor R4 and potentiometer 20 being connected through a filter capacitor C3 to conductor 14. Movable arm 20a of potentiometer 20 is connected through normally closed contacts RR3 and a resistor R6 to emitter E of transistor T2. As a result, movement of arm 20a in the counterclockwise direction effects decrease in the emitter to base current in transistor T2 and consequently increases the stopping time.

A deceleration timing potentiometer 22 is connected across potentiometer 20 and movable arm 22a thereof is connected through normally open contacts RR4 and the aforementioned resistor R6 to emiter E of transistor T2. Movement of arm 22a in the counterclockwise direction effects decrease in the emitter to base current in transistor T2 and consequently increases the deceleration time.

The output voltage appearing across capacitor C1 is preferably applied through an amplifier 24 of one or more stages as desired to a load 26. While load 26 has been shown schematically, it will be understood that the load may comprise a motor or a motor excitation network whereby control is afforded of the armature excitation, the field excitation or both. For a suitable load circuit usable with the invention reference may be had to Norman L. Peterson and Charles E. Smith copending application Serial No. 804,299, filed April 6, 1959, now Patent No. 3,047,729.

Amplifier 24 is provided with a semi-conductor device such as transistor T3 having an emitter electrode E, a base electrode B, and a collector electrode C. The junction of capacitor C1 and collector electrode C of transistor T2 is connected to base electrode B of transistor T3. The other; positive side of capacitor C1 is connected through a resistor R7 to emitter electrode E of transistor T3 and collector electrode C of the latter is connected to negative terminal 4 of the reference voltage source. The opposite ends of resistor R7 are connected to load 26.

The operation of the system of FIG. 3 will now be described. Let it be assumed that a direct current reference voltage source is connected to terminals 2 and 4 and that an alternating current source is connected to the primary winding of transformer PT. As a result, current flows in a circuit extending from positive terminal 2 through the resistance of potentiometer 8 and movable arm 6a and the upper portion of the resistance of potentiometer 6 to negative terminal 4. Half-wave rectified current flows from the left-hand end of the secondary winding of transformer PT through rectifier RCT-1, resistor R1, the resistance of potentiometer 18, resistor R2 and conductor 14 to the center tap of the secondary winding. An adjustable portion of this current is diverted from movable arm 18a through resistor R3, emitter E and base B of transistor T1 and junction 16 to conductor 14.

Similarly, half-wave rectified current flows during each alternate half-cycle from the right-hand end of the secondary winding of transformer PT through rectifier RCT-2, resistor R4, the resistance of potentiometer 20 and the resistance of potentiometer 22 in parallel, resistor R5 and conductor 14 to the center tap of the secondary winding. An adjustable portion of the current flowing through the resistance of potentiometer 20 is diverted from movable arm 20a through contacts RR3, resistor R6, emitter E and base B of transistor T2 and junction 16 to conductor 14.

To initiate operation of the system, run contacts RR1 and RR4 are closed and run contacts RR2 and RR3 are opened. Contacts RR1 connect a negative voltage from arm 8a of potentiometer 8 to collector electrode C of transistor T1. Contacts RR2 disconnect the collector electrode of transistor T1 from positive terminal 2. Contacts RR3 disconnect arm 20a of stopping timing potentiometer 20 and contacts RR4 connect arm 22a of deceleration timing potentiometer 22 through resistor R6 to the emitter electrode of transistor T2. Emitter to base current having been applied to transistor T1, the latter is rendered operative to pass a constant current as determined by the setting of potentiometer 18. Thus, constant current flows from terminal 2 through capacitor C1, collector C and base B of transistor T2 in the reverse direction, junction 16, conductor 14, resistor R2, potentiometer 18 and arm 18a, resistor R3, emitter and collector electrodes of transistor T1 and contacts RR1 to arm 8a of potentiometer 8. Capacitor C1 charges and the voltage thereacross increases linearly as shown in FIG. 2(B).

The voltage across capacitor C1 is applied across the emitter and base electrodes of amplifier transistor T3. This effects flow of amplified curent from positive terminal 2 through resistor R7, emitter E and collector C of transistor T3 to negative terminal 4. The voltage drop across resistor R7 is applied to load 26.

In view of the constant current characterictiss of transistor T1 whereby capacitor CI is charged linearly, the amplified voltage applied to load 26 increases linearly as a function of time. As a result, the motor controlled by load 26 accelerates. The acceleration time may be increased by turning potentiometer 18 in the direction of the arrow. This effects decrease in the emitter to base current of transistor T1 and consequently controls the latter to decrease the value of the charging current applied to capacitor C1. Conversely, the acceleration time may be decreased by turning potentiometer 18 in the other direction to increase the emitter to base current of transistor T1. Transistor T2 has essentially no effect on the charging current because this current flows therethrough in the reverse direction whereby transistor T2 exhibits very low, negligible impedance.

The magnitude of the output voltage applied to load 26 may be increased by turning speed setting potentiometer 8 in the direction of the arrow and decreased by turning the same in the opposite direction. This causes corresponding increase or decrease in the motor speed. The maximum voltage obtainable by adjustment of speed setting potentiometer 8 is determined and adjusted by setting movable arm 6a of potentiometer 6. Turning arm 6a all the way in the direction of the arrow shunts the resistance of potentiometer 6 effectively out of circuit so that the maximum voltage applicable to the timed reference circuit is equal to the voltage applied to terminals 2 and 4.

When the arm of potentiometer 8 is turned in the counterclockwise direction to decrease the motor speed, transistor T1 acts as a short circuit to current flowing in the reverse direction therethrough from collector C to base B and transistor T2 passes a current of constant value to discharge capacitor C1. The value of the discharge current is determined by the setting of deceleration timing potentiometer 22. Turning the arm of potentiometer 22 in the direction of the arrow effects decrease in the emitter to base current of transistor T2 and consequently controls the latter to decrease the discharge current thereby to increase the motor deceleration time. Conversely, the deceleration time may be decreased by turning arm 22a in the opposite direction to increase the emitter to base current of transistor T2 to effect quicker discharge of capacitor C1.

The stopping time of the motor may be controlled from potentiometer 20 in substantially the same manner hereinbefore described in connection with potentiometer 22 for controlling the deceleration time of the motor, these potentiometers being alternatively connectable to control transistor T2. To stop the motor, contacts RR1 and RR4 are opened and contacts RR2 and RR3 are closed. Contacts RR1 disconnect the input voltage source from the timed reference circuit and contacts RR4 disconnect deceleration timing potentiometer 22 from the emitter electrode of transistor T2. Contacts RR2 complete a discharge circuit for capacitor C1 and contacts RR3 connect arm 20a of potentiometer 20 to the emitter electrode of transistor T2. As a result, capacitor C1 discharges in a circuit extending through contacts RR2, collector C and base B of transistor T1 in the reverse direction, junction 16, conductor 14, resistor R5, potentiometer 20 and arm 20a, contacts RR3, resistor R6 and the emitter and collector electrodes of transistor T2 to capacitor C1. The value of this discharge current is constant for any given setting of potentiometer 20. The stopping time may be increased by turning arm 20a counterclockwise in the direction of the arrow to decrease the value of discharge current. Conversely, the stopping time may be decreased by turning arm 20a in the clockwise direction to increase the value of discharge current.

It will be apparent that the system hereinbefore described is extremely simple in construction and efficient in operation. The rate of acceleration as well as the rate of deceleration and stopping of the motor may be individually selected as desired. Since constant currents are employed to charge and discharge capacitor C1 and the value of such current is essentially solely a function of the emitter current of the transistor, the system affords linear control of the output voltage all the way to zero voltage difference between the input voltage and the voltage across capacitor C1.

I claim:
1. In an electrical control system, in combination,
 (a) a source of adjustable input voltage;
 (b) an electrical energy storage device;
 (c) first and second substantially constant current passing semi-conductor means, each said semi-conductor means comprising a main conduction path and a reverse conduction path;
 (d) means connecting the main conduction path of said first semi-conductor means and the reverse conduction path of said second semi-conductor means in series with said energy storage device across said source, said first semi-conductor means being effective to control conduction of a predetermined constant current from said input source to said energy storage device linearly to increase the voltage across said energy storage device, and the impedance of said reverse conduction path of said second semi-conductor means being substantially negligible whereby said current flow therethrough to said energy storage device is not affected by said second semi-conductor means;
 (e) means connecting the main conduction path of said second semi-conductor means and the reverse conduction path of said first semi-conductor means in series with said source across said energy storage device, said second semi-conductor means being effective when said input voltage is adjusted to a value below the voltage across said energy storage device to control discharge of said energy storage device at a predetermined constant current value linearly to decrease the voltage across said energy storage device, and the impedance of said reverse conduction path of said first semi-conductor means being substantially negligible whereby said discharge current flow therethrough is not affected by said first semi-conductor means;
 (f) and means for disconnecting said source and for connecting the main conduction path of said second semi-conductor means and the reverse conduction path of said first semi-conductor means in series across said energy storage device to conduct current flow from the latter thereby to cause the voltage across said energy storage device to decrease at a linear rate.

2. In an electrical control system, in combination;
 (a) a source of adjustable input voltage;
 (b) an electrical energy storage device;
 (c) first and second substantially constant current passing semi-conductor means, each said semi-conductor means having a controllable main conduction path and a reverse conduction path;
 (d) means connecting the main conduction path of said first semi-conductor means and the reverse conduction path of said second semi-conductor means in series with said energy storage device across said source to afford current flow to said energy storage device from said source;
 (e) means connecting said main conduction path of said second semi-conductor means and said reverse conduction path of said first semi-conductor means in series with said energy storage device across said source to afford discharge current flow from said energy storage device;
 (f) means for controlling said first semi-conductor means whereby the latter is effective to control conduction of a predetermined constant current from said input source to said energy storage device linearly to increase the voltage across said energy storage device, the impedance of said reverse conduction path of said second semi-conductor means being substantially negligible whereby said current flow therethrough is not affected by said second semi-conductor means;
 (g) means for controlling said second semi-conductor means when said input voltage is adjusted to a value below the voltage across said energy storage device whereby said second semi-conductor means is effective to control discharge of said energy storage device at a predetermined constant current value linearly to decrease the voltage across said energy storage device, the impedance of said reverse conduction path of said first semi-conduction means being substantially negligible whereby said discharge current flow therethrough is not affected by said first semi-conductor means;

(h) and said means for controlling said first semi-conductor means comprising adjustable means effective when adjusted in uniform steps for causing corresponding uniform adjustments in proportion thereto of the magnitude of the current passing through the main conduction path of said first semi-conductor means whenever the magnitude of said input voltage is increased thereby to cause proportionally uniform adjustments in the rate of increase of the magnitude of the voltage across said energy storage device.

3. The invention defined in claim 2, wherein said means for controlling said second semi-conductor means comprises adjustable means effective when adjusted in uniform steps for causing corresponding uniform adjustments in proportion thereto of the magnitude of the current passing through the main conduction path of said second semi-conductor means whenever the magnitude of said input voltage is decreased thereby to cause proportionally uniform adjustments in the rate of decrease of the magnitude of the voltage across said energy storage device.

4. In a timed reference voltage control system, in combination;
(a) a source of input reference voltage;
(b) an electrical energy storage device;
(c) a first semi-conductor control device;
(d) a second semi-conductor control device;
(e) each said control device comprising a forward current conduction path and means for controlling current flow therethrough at a substantially constant rate and a reverse current conduction path having negligible impedance to current flow;
(f) means for connecting said input source and said first and second control devices and said energy storage device to one another to provide a circuit for current flow from said source through said forward path of said first control device and said reverse path of said second control device to said energy storage device whenever the voltage of said source is higher than the voltage across said energy storage device and to provide a circuit for current flow from said energy storage device through said forward path of said second control device and said reverse path of said first control device to said source whenever the voltage across said energy storage device is higher than the voltage of said source thereby to provide an output voltage which changes linearly in response to change in magnitude of said input voltage;
(h) and each said means for controlling current flow comprising adjustable control voltage means effective when adjusted in uniform steps for causing corresponding uniform adjustments in proportion thereto of the magnitude of the current passing through the forward current conduction path of the associated semi-conductor control device whenever the magnitude of said input reference voltage is changed thereby to cause proportionally uniform adjustments in the rate of change of the magnitude of the voltage across said energy storage device.

5. The invention defined in claim 4, together with:
(a) switch means for disconnecting said input voltage source and for connecting the forward current conduction path of said second semi-conductor control device and the reverse current conduction path of said first semi-conductor control device in series across said energy storage device thereby to cause said output voltage linearly to decrease to zero value.

6. In a timed reference voltage control system, in combination;
(a) a source of adjustable input reference voltage;
(b) an electrical energy storage device for providing an output voltage;
(c) a first semi-conductor control device;
(d) a second semi-conductor control device;
(e) each said semi-conductor control device comprising a forward current conduction path effective to cause current flow therethrough at a predetermined substantially constant rate and a reverse current conduction path allowing unrestricted flow of current;
(f) circuit means providing a circuit for current flow from said source through the forward current conduction path of said first semi-conductor control device and the reverse current condution path of said second semi-conductor control device to said energy storage device when said input voltage is higher than the voltage across said energy storage device thereby to provide a linearly increasing output voltage, said circuit means also providing a circuit for current flow from said energy storage device through the forward current conduction path of said second semi-conductor control device and the reverse current conduction path of said first semi-conductor control device to said source when said input voltage is decereased below the voltage across said energy storage device thereby to provide a linearly decreasing output voltage;
(g) first means for adjusting the rate of current flow through the forward current conduction path of said first semi-conductor control device thereby to select the linear rate of increase of output voltage;
(h) and second means for adjusting the rate of current flow through the forward current conduction path of said second semi-conductor control device thereby to select the linear rate of decrease of output voltage;
(i) and said first means and said second means comprising a source of control voltage;
(j) first adjustable voltage divider means supplied from said control voltage source and being effective when adjusted in uniform steps for causing corresponding uniform adjustments in proportion thereto of the value of current flowing through the forward conduction path of said first semi-conductor control device whenever said input voltage is increased in value thereby to cause proportionally uniform adjustments in the rate of increase of said output voltage;
(k) and second adjustable voltage divider means supplied from said control voltage source and being effective when adjusted in uniform steps for causing corresponding uniform adjustments in proportion thereto of the value of current flowing through the forward conduction path of said second semi-conductor control device whenever said input voltage is decreased in value thereby to cause proportionally uniform adjustments in the rate of decrease of said output voltage.

7. The invention defined in claim 6, together with;
(a) third adjustable voltage divider means supplied from said control voltage source and being effective when adjusted in uniform steps for causing corresponding uniform adjustments in proportion thereto of the value of current flowing through the forward conduction path of said second semi-conductor control device when said input voltage is discontinued thereby to cause proportionally uniform adjustments in the rate of decrease of said output voltage to zero value;
(b) first switch means operable to disconnect said input source and to connect the forward current conduction path of said second semi-conductor control device and the reverse current conduction path of said first semi-conductor control device in series across said energy storage device to provide a discharge current path for the latter;

(c) and second switch means operable concurrently with said first switch means to disconnect said second adjustable voltage divider means and to connect said third adjustable voltage divider means to said second semi-conductor control device for controlling the linear rate of decrease of said output voltage to zero value.

8. In a timed reference voltage control system, in combination;
 (a) a source of adjustable input reference voltage;
 (b) an energy storage device;
 (c) a first transistor and a second transistor, each said transistor having an emitter and a collector and a base;
 (d) and circuit means comprising means connecting the emitter-collector junction of said first transistor and the collector-base junction of said second transistor in series with said energy storage device across said source to provide a first circuit for current flow from said source to said energy storage device;
 (e) means connecting the emitter-collector junction of said second transistor and the collector-base junction of said first transistor in series with said energy storage device across said source to provide a second circuit for current flow from said energy storage device to said source;
 (f) means comprising a control voltage source and a first potentiometer supplied therefrom and being connected to the emitter-base junction of said first transistor for applying an adjustable voltage to the latter, said first potentiometer being effective when adjusted in equal increments for causing proportionally equal incremental adjustments of the value of current flowing in said first circuit when said input reference voltage is increased in value thereby to cause respectively proportionally equal incremental adjustments in the rate of increase of voltage across said energy storage device;
 (g) and means comprising a second potentiometer supplied from said control voltage source and being connectable to the emitter-base junction of said second transistor for applying an adjustable voltage to the latter, said second potentiometer being effective when adjusted in equal increments for causing proportionally equal incremental adjustments of the value of current flowing in said second circuit when said input reference voltage is decreased in value thereby to cause respectively proportionally equal incremental adjustments in the rate of decrease of the voltage across said energy storage device.

9. The invention defined in claim 8, wherein said energy storage device comprises at least one capacitor.

10. The invention defined in claim 8, together with;
 (a) switching means operable to connect the emitter-collector junction of said second transistor and the collector-base junction of said first transistor across said energy storage device to provide a third circuit for current flow from said energy storage device;
 (b) means comprising a third potentiometer supplied from said control voltage source and being connectable to the emitter-base junction of said second transistor for applying an adjustable control voltage to the latter;
 (c) and said switching means comprising means for disconnecting said second potentiometer from and for connecting said third potentiometer to the emitter-base junction of said second transistor, said third potentiometer being effective when adjusted in equal increments for causing proportionally equal incremental adjustments of the value of current flowing in said third circuit to cause respectively proportionally equal incremental adjustments in the rate of decrease of the voltage on said energy storage device to zero value.

11. In a timed reference voltage control system, in combination:
 (a) a source of adjustable input reference voltage;
 (b) an electrical energy storage device for providing an output voltage;
 (c) a first semi-conductor control device;
 (d) a second semi-conductor control device;
 (e) each said semi-conductor control device comprising a forward current conduction path effective to cause current flow therethrough at a predetermined substantially constant rate and a reverse current conduction path allowing unrestricted flow of current;
 (f) circuit means providing a circuit for current flow from said source through the forward current conduction path of said first semi-conductor control device and the reverse current conduction path of said second semi-conductor control device to said energy storage device when said input voltage is higher than the voltage across said energy storage device thereby to provide a linearly increasing output voltage, said circuit means also providing a circuit for current flow from said energy storage device through the forward current conduction path of said second semi-conductor control device and the reverse current conduction path of said first semi-conductor control device to said source when said input voltage is decreased below the voltage across said energy storage device thereby to provide a linearly decreasing output voltage;
 (g) first means for adjusting the rate of current flow through the forward current conduction path of said first semi-conductor control device thereby to select the linear rate of increase of output voltage;
 (h) second means for adjusting the rate of current flow through the forward current conduction path of said second semi-conductor control device thereby to select a linear rate of decrease of output voltage;
 (i) third means for adjusting the rate of current flow through the forward current conduction path of said second semi-conductor control device thereby to select a second linear rate of decrease of output voltage;
 (j) and switching means to disconnect said second adjusting means and to connect said third adjusting means to said second semi-conductor control device.

References Cited by the Examiner

UNITED STATES PATENTS

| | | | |
|---|---|---|---|
| 2,468,080 | 4/1949 | Klemperer | 320—1 |
| 2,823,319 | 2/1958 | Vossberg | 307—108 X |
| 2,888,632 | 5/1959 | Livezey | 323—22 |
| 2,929,980 | 3/1960 | Anger | 318—391 |
| 2,942,169 | 6/1960 | Kalfaian | 320—1 |
| 3,019,379 | 1/1962 | Zarleng | 320—1 X |

IRVING L. SRAGOW, *Primary Examiner.*

MILTON O. HIRSHFIELD, ORIS L. RADER,
*Examiners.*

R. J. CRAWFORD, R. J. McCLOSKEY, A. V. NANNI,
*Assistant Examiners.*